Figure 2:
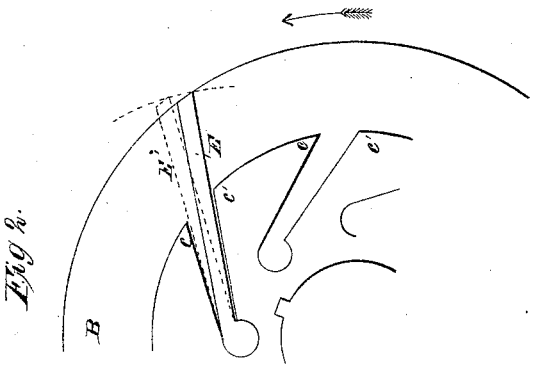
Figure 1:
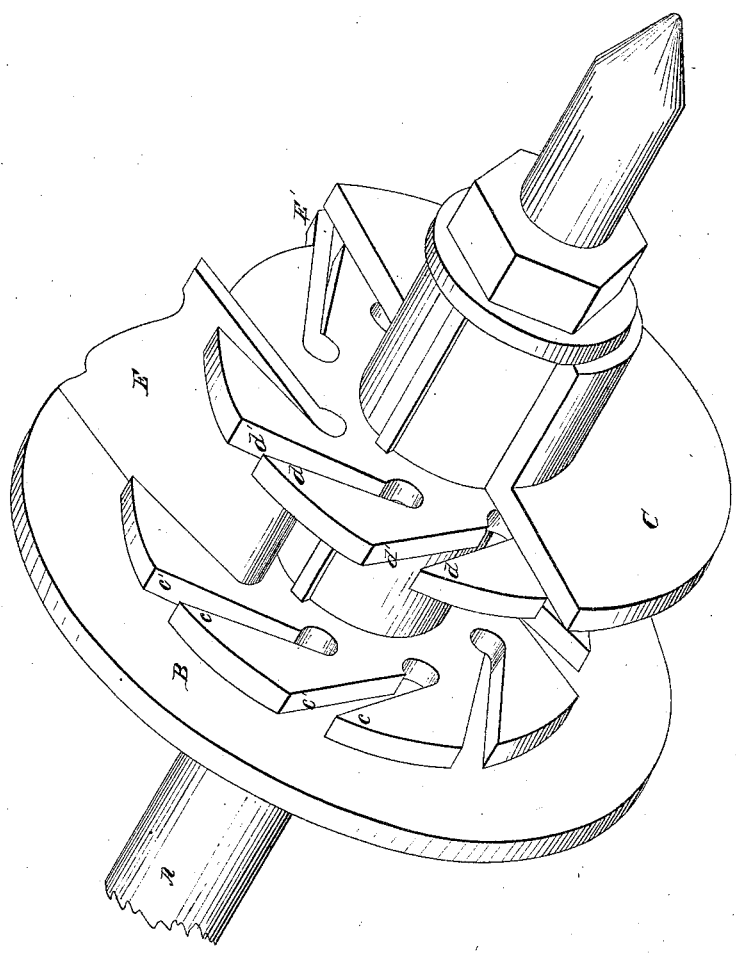

J. M. Smith,
Cutter Head,
No. 10,017.  Patented Sep. 13, 1853.

UNITED STATES PATENT OFFICE.

JOSIAH M. SMITH, OF NEW YORK, N. Y.

IMPROVED CUTTER-HEAD FOR MOLDING-MACHINES.

Specification forming part of Letters Patent No. 10,017, dated September 13, 1853.

*To all whom it may concern:*

Be it known that I, JOSIAH M. SMITH, of the city, county, and State of New York, have invented certain new and useful Improvements in the Cutter-Head of a Molding-Machine; and I do hereby declare that the following is a full, clear, and exact description of the same, reference being made to the annexed drawings, making a part of this specification, in which—

Figure I is a perspective view, partly in section. Fig. II is a diagram in detail.

Similar letters refer to similar parts throughout.

My invention consists in an improvement in the construction of cutter-heads for cutting moldings in wood, marble, and other like materials.

The object designed to be accomplished by me is the ability to treat and afterward keep in order the cutting-edges of the series of chisels.

The difficulty heretofore experienced was in obtaining and keeping the chisels of an exact length and shape, and also in keeping the angle of the bevel forming their several edges equal. This arose from the necessity of sharpening each chisel by itself and detached from the spindle or head-piece.

By my invention each chisel, after being in the first place brought near to the required shape of edge to form the outline of the intended molding, is arranged in its proper place in the head and the whole are then ground in to an exact equality by the revolution of the spindle in the reverse direction from that in which it is to run when in the act of cutting. The sectional edge of each chisel is therefore the segment of a circle, and in cutting each individual edge must necessarily be brought upon the material in the precise path that the one preceding it had, and hence there is a constant repetition of the same figure. Molding cut by such a tool will have as exact a form as it would have were it planed out from a single chisel, as will be more evident from the following description of its construction and operation.

Upon a proper spindle A there is a permanent flange or disk B, fixed to revolve with it. Next to this are the other disks of lesser dimensions set a short distance apart upon the spindle and having a series of slots cut in them, as shown at $c\,d$. The general direction in which the slots are cut is such that one side points to the direction in which the chisels must stand when in the act of cutting and the other edge the direction or angle which the chisel must have when its edge is being sharpened. To do this the slot is V-shaped, as more clearly seen in the diagram, Fig. II, where $c$ represents the edge whose angle is at the proper inclination for the chisel while cutting, and $c'$ the angle when the edge is to be ground sharp. From this it is evident the chisels must be capable of a small motion, as if hinged, which is the case, as will more fully appear. At C is another flange or disk similar to B. This latter one, however, is capable of being slipped off the spindle, but rotates with it, being carried round by a feather and slot, as shown. The flange is set up against the slotted one $d$ by a pinch-nut and effects the keeping of the chisels in place by pressing against their ends. The chisels are seen at $e\,e'$ and are flat pieces of steel one edge of which is shaped proper to give the figure of the intended molding, and the other is rounded, so as to form a rib. This latter enables it to fit in a gullet at the bottom of the slots $c\,d$, and when placed in said gullet acts on the principle of a hinge. Each slot $c\,d$ is to contain a chisel of the same character. The manner of putting them in place is by taking off the flange C from the spindle; then push each chisel in the slots; put on the flange again; set it up with a pinch-nut; then all will be kept in place. The only motion the chisels can now have will be the ability to vibrate on the inner edge or rib as an axis to the extent of the small distance from $c$ to $c'$ and from $d$ to $d'$. The ability to do this constitutes the main feature of advantage. It is now supposed that all the chisels are in the head, suitable to produce some required molding. The edges of each are to be brought to an exact similarity of figure and are also to terminate and act in the same circle. Each chisel is made to rest upon the side of the slots $c'\,d'$, as seen at $e$, Fig. II. The spindle is then revolved in direction of the arrow, which direction is contrary to the cutting motion. Grinding-tools are now applied, and as each chisel passes by the edges are all ground down alike and will be segments of a circle, as clearly seen in Fig. II, and each position of the edge of one will be the counterpart of the edge of the other, which is immediately behind all the way round, and hence fac-similes. Now, alter the positions by making the chisels rest against the edge $c$ and $d$ of the slots. This will alter the angle and the beveled edges will no longer correspond to the circular line on which they were ground, but will assume another angle, which is the proper one to effect the cutting, as seen in the dotted lines $e'$, Fig. II. By reversing the motion the cutting-edges of the bevel are presented, and any object placed upon the bed of the machine will be cut to the exact figure that the several chisels have been ground to produce, and the sharpening is afterward effected by restoring the former motion and applying the grinding materials as before described, so that the chisels may always be kept in perfect working order without taking the head apart or risk of deranging their set or figure.

It is evident that other kinds of stops can be made to govern the movement of the chisels, as pins projecting from the permanent disks, or grooves cut in them would answer; but I prefer the arrangement described.

What I claim as of my own invention, and desire to secure by Letters Patent of the United States, is—

The combination of the slotted supporting-flanges or their equivalents with the chisels, hinged and operated in the manner and for the purposes substantially as set forth herein.

JOSIAH M. SMITH.

Witnesses:
S. H. MAYNARD,
F. L. SWEET.